United States Patent [19]

Periat et al.

[11] 3,841,854
[45] Oct. 15, 1974

[54] APPARATUS FOR HEATING A GLASS FIBER FORMING SPINNER

[75] Inventors: Douglas Marion Periat, Toledo; David Lawrence Oster, Whitehouse, both of Ohio

[73] Assignee: Johns-Manville Corporation, Greenwood Village, Colo.

[22] Filed: Nov. 24, 1972

[21] Appl. No.: 309,548

[52] U.S. Cl............................ 65/12, 65/15
[51] Int. Cl............................ C03b 37/02
[58] Field of Search............ 65/6, 8, 12, 14, 15

[56] References Cited
UNITED STATES PATENTS

| | | | |
|---|---|---|---|
| 3,265,483 | 8/1966 | Garrison et al. | 65/6 X |
| 3,273,358 | 9/1966 | Kleist et al. | 65/6 |
| 3,304,164 | 2/1967 | Charpientier et al. | 65/8 X |
| 3,336,125 | 8/1967 | Schacter | 65/14 |
| 3,622,293 | 11/1971 | Firnhaber | 65/6 X |
| 3,650,716 | 3/1972 | Brossard | 65/6 |

*Primary Examiner*—Robert L. Lindsay, Jr.
*Attorney, Agent, or Firm*—John A. McKinney; Robert M. Krone; John D. Lister

[57] ABSTRACT

An apparatus for heating a spinner in a fiber producing process comprises a generally arcuate shaped manifold with a plurality of burners spaced about the manifold and directed outwardly and downwardly from the manifold toward a peripheral portion of the spinner.

4 Claims, 3 Drawing Figures

3,841,854

3,841,854

APPARATUS FOR HEATING A GLASS FIBER FORMING SPINNER

BACKGROUND OF THE INVENTION

The invention relates to a spinner heater and in particular to an improved spinner heater for evenly distributing heat over the spinner including the peripheral portion of the heater.

In the formation of glass fibers by a rotary process, molten glass is deposited on a disc of a spinner having an annular peripheral wall extending upward from the disc. The centrifugal force on the glass caused by the rotation of the spinner forces the glass against the wall and through a plurality of tiny orifices in the wall. The glass exits from the spinner orifices in the form of fibers which can then be collected.

A spinner heater is required to pre-heat the spinner and to maintain the spinner at a temperature high enough to prevent the glass from solidifying on the disc, the spinner wall or in the spinner orifices. Of course, if and when orifices become closed, the effectiveness of the spinner as a filament producing apparatus is decreased.

Previous spinner heaters utilized an apparatus wherein the burners were directed downward from a manifold in a vertical direction so as to direct the heat from the burners onto the disc of the spinner at locations spaced inwardly from the peripheral wall of the spinner. Due to the attitude of the burners and their location, the burners could not effectively heat the peripheral wall of the spinner. When baffles were located on the disc, the burners could not even distribute the heat over and around the baffles to evenly distribute the the heat over the disc.

Furthermore, the burners utilized required a rich air-gas ratio of about 5 to 1 in order to maintain the disc at a high enough temperature. This rich mixture, in addition to being relatively expensive, resulted in unburnt fuel which caused a deleterious secondary combustion in the fiber attenuation area.

SUMMARY OF THE INVENTION

Accordingly, it is an object of the present invention to provide a spinner heater which will evenly distribute heat over and around baffles on a spinner disc while also effectively heating the peripheral wall of the spinner. It is a further object of the present invention to utilize burners in the spinner heater which use a less rich air-gas ratio, e.g., 10 to 1 and have complete combustion of the mixture within the burner.

The apparatus for heating a spinner in a fiber producing process comprises a generally arcuate manifold which is supported above a disc of the spinner. The manifold is provided with a plurality of burners which are directed radially outward and downward from the manifold toward an outer portion of the spinner. The manifold is discontinuous and permits the introduction of molten glass to the disc of the spinner by an off-center pore wherein the molten glass first strikes the disc of the spinner in area radially spaced from the axis of rotation of the spinner.

DESCRIPTION OF THE PREFERRED EMBODIMENT

Figure 1:
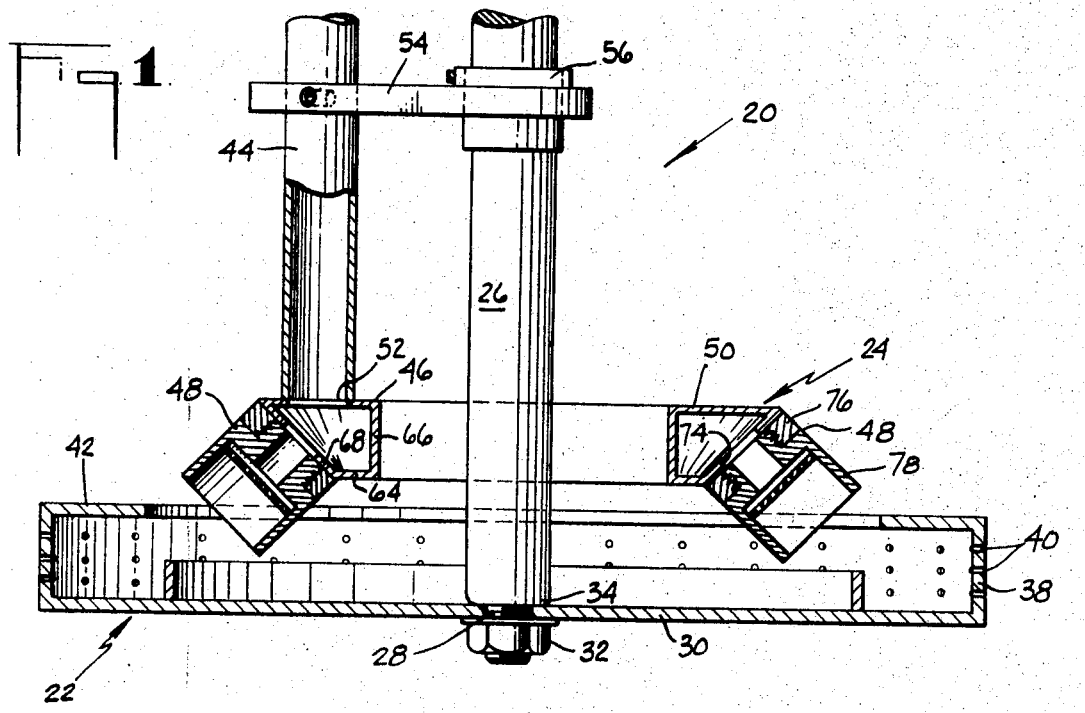
FIG. 1 is a vertical cross-sectional view substantially through the center of a spinner and an accompanying spinner heater.
Figure 3:
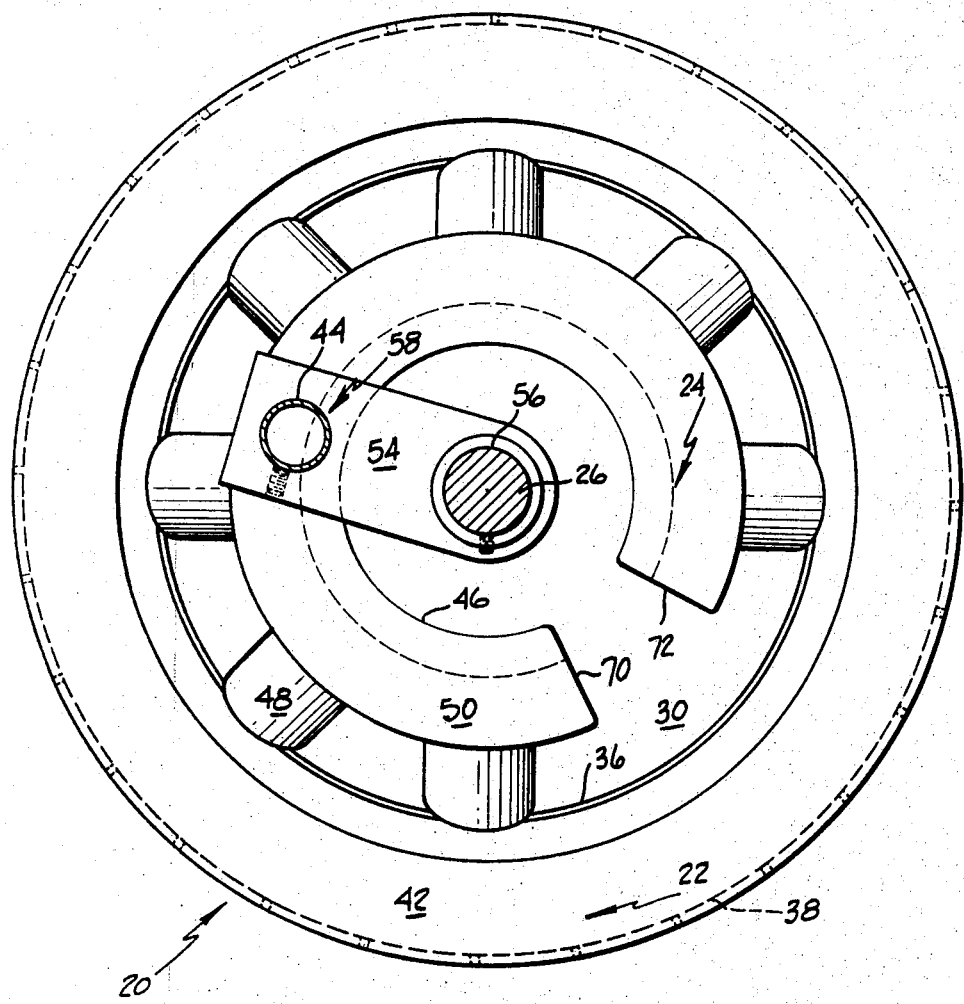
FIG. 3 is a plan view of the spinner and the accompanying spinner heater illustrated in FIG. 1.

As illustrated in FIGS. 1 and 3, the spinner assembly 20 comprises a spinner 22 and a spinner heater 24. The spinner comprises a drive and support shaft 26 which both supports the spinner 22 and effects the rotation of the spinner during the fiberizing process. The upper portion of the shaft 26 is supported in conventional bearings not shown and driven by an electric motor or other conventional drive means to effect the rotation of the spinner. The lower portion of the shaft 26 has a reduced diameter threaded portion 28 which extends through a disc 30 of the spinner. A nut 32 is threaded onto the reduced portion 28, of the shaft and engages the underside of the disc. The nut 32 clamps the disc 30 of the spinner between itself and a shoulder 34 intermediate the main portion of shaft 26 and the reduced portion 28.

The disc 30 of the spinner is circular in configuration and can be provided within annular baffle or rib 36 which is welded to and extends upwardly from an upper face of the disc. The spinner is provided with a peripheral wall 38. This wall is an annular wall which is welded or otherwise secured to the periphery of the disc 30. The wall 38 is provided with rows of apertures or orifices 40 through which glass is forced by centrifugal force to effect fiberization of the glass. To strengthen the peripheral wall 38, the spinner is provided with an inwardly directed annular flange 42 which is welded or otherwise affixed to the upper edge of the peripheral wall. This flange 42 lends the required reinforcement to the wall of the disc when it is operating at high speeds.

The spinner heater 24 includes a vertical supply pipe 44, an arcuate manifold 46 and a plurality of burners 48. The supply pipe 44 supplies the air-gas mixture to the manifold 46. As shown in FIG. 1, the lower end of the supply pipe 44 is welded or otherwise secured to an upper surface 50 of the manifold 46 and communicates with the interior of the manifold through an aperture 52. The upper end of the supply pipe 44 is connected to a suitable source of a pressurized fuel-air mixture which is not shown.

The supply pipe 44 and consequently the manifold 46 is supported by a support bracket 54. One end of the support bracket is supported on the shaft 26 by a bearing assembly 56. The bearing assembly permits the shaft 26 to rotate without imparting rotation to the bracket 54. The other end of the support bracket is provided with a clamping assembly 58 for clamping the supply pipe 44 to the support bracket. While many various clamping constructions could be utilized, the clamp shown in the figure comprises an aperture 60 which is provided with a set screw 62 or other conventional means to lock the supply pipe 44 in place. If the screw 62 is loosened the supply pipe 44 can be slid in the vertical direction relative to the bracket to adjust the height of the manifold 46 relative to the spinner. By tightening the screw 62 once the proper adjustment has been obtained the manifold is retained in the proper location relative to the spinner.

The arcuate manifold 46 lies in a horizontal plane and extends for an arc of more than 270° and preferably about 320° to 330°. In addition to the upper wall 50 the manifold is provided with a lower wall 64, an inner wall 66 extending vertically between the upper wall and the lower wall, and an outer wall 68 which extends upwardly and radially outward from the lower wall toward the upper wall at an angle of about 45° relative to the horizontal. A pair of end walls 70 and 72 close the ends of the discontinuous arcuate manifold 46. The manifold is constructed large enough to permit stoichiometric combustion and provide equal gas pressure for all of the burners 48.

The burners 48 have bodies 76 which are welded to the manifold 46 and nozzles 78 which are threaded into the bodies 76. The centerlines of the burners 48 extend outwardly and downwardly from the manifold at an angle of about 45° relative to vertical whereby the heat from the burners is directed toward an outer peripheral portion of the spinner. The burners 48 communicate with the interior of the manifold 46 through supply ports 74. The burners are conventional radient burners such as those marketed by Selas Co. With the use of the radient type burners, complete combustion takes place within the burner thereby alleviating any problem of external combustion about the attenuation zone.

Figure 2:
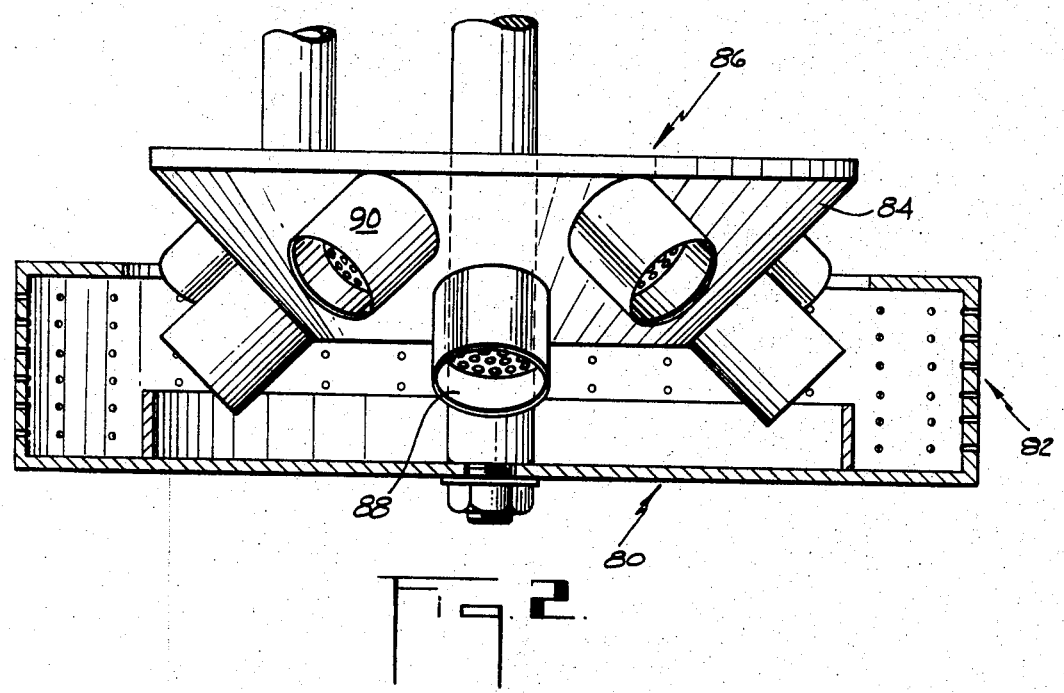
FIG. 2 is an elevational view, with a section through the spinner, illustrating a second embodiment of the spinner heater.

FIG. 2 illustrates a second embodiment of the present invention to be utilized with spinners 80 having higher peripheral walls 82 than those normally used for spinners. To provide adequate heating for this type of spinner, an outer inclined surface 84 of the manifold 86 is increased in height and is provided with two rows of burners 88 and 90 which are secured to the manifold and communicate with the interior of the manifold. The burners extend outwardly and downwardly from the surface 80 an angle of about 45° relative to the vertical. As can be seen in FIG. 2 alternate burners are located in the same horizontal plane while adjacent burners are located in different planes. Except for the distinctions detailed above, the construction of the embodiment of FIG. 2 is identical to that of FIGS. 1 and 3 and consequently to avoid unnecessary repetition the embodiment of FIG. 2 will not be described in further detail.

In operation when a spinner 22 or 80 is going to be utilized in a fiberizing process the rotation of the spinner is commenced. Then the burners 48 or 88 and 90 of the spinner heater are ignited and the spinner is heated to a temperature that is high enough to keep the glass that is being fiberized from solidifying on the disc of the spinner or in the orifices of the peripheral wall 38 or 82 of the spinner. Once the spinner is hot enough, the molten glass is poured onto the disc of spinner at a point offset with respect to the centerline of the spinner. While the glass contributes to the heating of the spinner, the spinner heater 24 is left in operation to assure that the temperature remains sufficiently high for the proper operation of the spinner.

Both the spinner and the spinner heater are constructed of suitable metal alloys capable of withstanding the temperatures encountered in rotary fiberizing processes. From the above, it can be seen that the apparatus for the present invention provides a spinner heater which more effectively heats the spinner and is more efficient in its utilization of fuel.

What we claim is:

1. An apparatus for heating a spinner in a fiber producing process wherein molten glass is delivered to the interior of the spinner at a location on a bottom disc of the spinner spaced outward from the center of the spinner and the molten glass flows out through orifices in a peripheral wall of the spinner to form fibers comprising:

a generally arcuate manifold which extends for at least 270° and is discontinuous to permit the delivery of the molten glass to the spinner, a plurality of burners carried by the manifold, the burners being directed radially outward and downward from the manifold toward an outer portion of the spinner and having centerlines extending at an angle of about 45° with respect to the vertical whereby both the bottom disc and the peripheral wall of the spinner are heated, and support means for supporting the manifold above the disc of the spinner.

2. An apparatus as claimed in claim 1 wherein:
   the manifold extends for about 320° to 330°.

3. An apparatus as claimed in claim 1 wherein:
   the burners lie in two horizontal planes with alternate burners being in the same plane and adjacent burners being in different planes.

4. An apparatus as claimed in claim 1 wherein:
   the support means for the manifold is adjustable in a vertical direction to adjust the height of the burner means relative to the spinner.

* * * * *